US011850994B2

(12) United States Patent
Shim et al.

(10) Patent No.: US 11,850,994 B2
(45) Date of Patent: Dec. 26, 2023

(54) LEVELING APPARATUS FOR A VEHICLE HEADLAMP HAVING A TILTING SENSOR AND A LIGHT SOURCE MODULE THAT TILT TOGETHER

(71) Applicants: HYUNDAI MOTOR COMPANY, Seoul (KR); KIA CORPORATION, Seoul (KR)

(72) Inventors: Joon Bo Shim, Seoul (KR); Seung Pyo Hong, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 23 days.

(21) Appl. No.: 17/738,769

(22) Filed: May 6, 2022

(65) Prior Publication Data
US 2023/0038167 A1 Feb. 9, 2023

(30) Foreign Application Priority Data
Aug. 5, 2021 (KR) .......................... 10-2021-0103414

(51) Int. Cl.
*B60Q 1/115* (2006.01)
*B60Q 1/11* (2006.01)

(52) U.S. Cl.
CPC ................ *B60Q 1/115* (2013.01); *B60Q 1/11* (2013.01); *B60Q 2300/114* (2013.01); *B60Q 2300/132* (2013.01); *B60Q 2300/324* (2013.01)

(58) Field of Classification Search
CPC ................ B60Q 1/10; B60Q 2300/132; B60Q 2300/324; B60Q 1/08; B60Q 1/085; B60Q 1/105
See application file for complete search history.

(56) References Cited

U.S. PATENT DOCUMENTS

| 10,259,380 | B2 | 4/2019 | Ko et al. |
| 10,647,246 | B2 | 5/2020 | Lim et al. |
| 10,802,149 | B2 | 10/2020 | Stettner et al. |
| 11,215,699 | B2 * | 1/2022 | Masuda ................ F21S 41/151 |
| 2017/0328533 | A1 | 11/2017 | Ko et al. |
| 2018/0043818 | A1 | 2/2018 | Lim et al. |
| 2022/0097599 | A1 * | 3/2022 | Kim ..................... B60Q 1/0023 |

FOREIGN PATENT DOCUMENTS

| KR | 101795253 B1 | 11/2017 |
| KR | 20180066351 A | 6/2018 |
| KR | 102213770 B1 | 2/2021 |

* cited by examiner

*Primary Examiner* — Robert J May
(74) *Attorney, Agent, or Firm* — LEMPIA SUMMERFIELD KATZ LLC

(57) ABSTRACT

A leveling apparatus for a vehicle headlamp includes: a housing disposed at a front side of a vehicle; a light source module disposed in the housing to emit light; a tilting sensor disposed in the housing to detect an inclination degree of a road; a tilting means to tilt the light source module and the tilting sensor together; and a controller. The controller receives a signal detected by the tilting sensor and controls the tilting means based on the inclination degree of the road to adjust a light emission angle of the light source module. In addition, the tilting sensor operates until a sensed output of the tilting sensor reaches a normal range.

15 Claims, 4 Drawing Sheets

LEVELING APPARATUS FOR A VEHICLE HEADLAMP HAVING A TILTING SENSOR AND A LIGHT SOURCE MODULE THAT TILT TOGETHER

CROSS REFERENCE TO RELATED APPLICATION

This application claims priority to and the benefits of Korean Patent Application No. 10-2021-0103414, filed Aug. 5, 2021, the entire contents of which are incorporated herein for all purposes by reference.

BACKGROUND

Field

The present disclosure relates to a leveling apparatus for a headlamp for a vehicle, in which a sensor for scanning a road surface and a light source module for emitting light are integrated.

Description of the Related Art

In general, a headlamp emits a light beam toward a front area of a vehicle and provides a visual field at night by emitting the light beam in a direction in which the vehicle travels. Because the headlamp emits the light beam to a location in front of the vehicle at night, a driver can get visual information of the front area of the vehicle. Therefore, when a front visual field is ensured at night, the driver can recognize other vehicles and obstacles on the road and thus safely drive the vehicle.

Meanwhile, because the headlamp emits light beams to a fixed position with respect to the ground surface, a light emission position of the headlamp is restricted, which makes it difficult to ensure a light amount depending on a road surface state.

Therefore, a leveling system for adjusting a light emission angle in an upward/downward direction is applied to the headlamp.

The leveling system for a headlamp recognizes a change in suspension using a mechanical sensor mounted on a trailing arm of the vehicle and adjusts a light emission direction of the headlamp by deriving a gradient of a vehicle body. However, the leveling system ignores a tire pressure and a height difference, which causes a deterioration in the accuracy of the light emission position.

In addition, another example of the leveling system for a headlamp uses an acceleration sensor provided in the vehicle to adjust the light emission direction of the headlamp in conjunction with a method of predicting a vehicle posture in a gravitational direction. However, because the leveling system cannot recognize a change in gradient of the vehicle body based on an upward or downward slope, there is a problem in that the light emission position of the headlamp cannot be controlled.

The foregoing explained as the background is intended merely to aid in the understanding of the background of the present disclosure, and is not intended to mean that the present disclosure falls within the purview of the related art that is already known to those having ordinary skill in the art.

SUMMARY

The present disclosure provides a leveling apparatus for a headlamp for a vehicle, in which a sensor for scanning a road surface and a light source module for emitting light are integrated, and a light emission position is adjusted depending on a gradient of a road measured by the sensor. Thus, the present disclosure simplifies control for adjusting the light emission position and improves accuracy and reliability in respect to a change in light emission positions.

In an exemplary embodiment of the present disclosure, a leveling apparatus for a headlamp for a vehicle includes: a housing disposed at a front side of a vehicle; a light source module disposed in the housing and configured to emit light; a tilting sensor disposed in the housing and configured to detect an inclination degree of a road; a tilting means configured to tilt the light source module and the tilting sensor together; and a controller configured to receive a signal detected by the tilting sensor and control the tilting means based on the inclination degree of the road to adjust a light emission angle of the light source module.

The tilting means may include: a base plate rotatably installed on a pivot part extending forward from the housing and configured to allow the light source module and the tilting sensor to be installed thereon; and a rotational mechanism installed in the housing, connected to the base plate, and configured to tilt the base plate depending on whether the operation is performed.

The tilting sensor may be installed on a rotation center axis of the base plate and rotate coaxially with the base plate.

The light source module may be installed on the base plate and disposed adjacent to the tilting sensor so as not to overlap a sensing range of the tilting sensor.

The rotational mechanism may include: a drive part installed in the housing and configured to generate power; and a movement part installed on the base plate, connected to the drive part, and configured to move in a forward/rearward direction by receiving power from the drive part to tilt the base plate.

The drive part may be configured as a rotary motor and have a power transmission part having a circular shape, and the movement part may be disposed to be in friction contact with the power transmission part and move the base plate by changing in length by receiving a rotational force when the power transmission part rotates.

The drive part may be configured as a rotary motor and have a power transmission part having a circular shape, and the movement part may be connected to the power transmission part by means of a belt and move the base plate by changing in length when the power transmission part rotates.

The leveling apparatus may further include an outer lens mounted on a front surface of the housing, configured to transmit light emitted from the light source module and the tilting sensor, and having a distortion compensation part formed in a partial section thereof.

The distortion compensation part may be formed such that an angle at which sensing light emitted from the tilting sensor enters an incident surface of the outer lens is equal to an angle at which the sensing light exits an emergent surface of the outer lens.

The distortion compensation part may be formed within a predetermined range in an upward/downward direction on the emergent surface of the outer lens based on a distance by which the sensing light moves to the emergent surface after being refracted on the incident surface and a point at which the sensing light enters the emergent surface.

When a change in angle detected by the tilting sensor is equal to or larger than a reference angle, the controller may recognize whether the amount of change in angle increases or decreases and allow the tilting means to tilt depending on the amount of change in angle.

The controller may control a tilting operation of the tilting means so that the change in angle detected by the tilting sensor reaches an initial angle.

According to the leveling apparatus for a headlamp for a vehicle structured as described above, the tilting sensor for scanning the road surface and the light source module for emitting the light are integrated, such that the control for adjusting the light emission position is simplified, and the accuracy and reliability in respect to the change in light emission positions are improved.

That is, since the angle of the tilting sensor and the angle of the light source module are adjusted together by the motor, the leveling condition is simplified into the relationship between the optical module and the road surface.

In addition, during the aiming operation on the light source module performed by the operation of the motor, the sensing direction of the tilting sensor and the road surface are coincident with each other, and the feedback is performed on the road surface. Therefore, the recognition of the road surface and the determination of breakdown caused by a consistent sensing error may be performed without a separate structure.

In addition, during the aiming operation performed on the light source module, the actuator according to the present disclosure only performs the control so that the sensing of the tilting sensor operates until the tilting sensor reaches a normal range, which makes it possible to simplify the control. Further, the rotational mechanism constituting the actuator operates by means of friction or the belt, such that the mechanical noise is minimized, and the discomfort caused by the noise is reduced.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
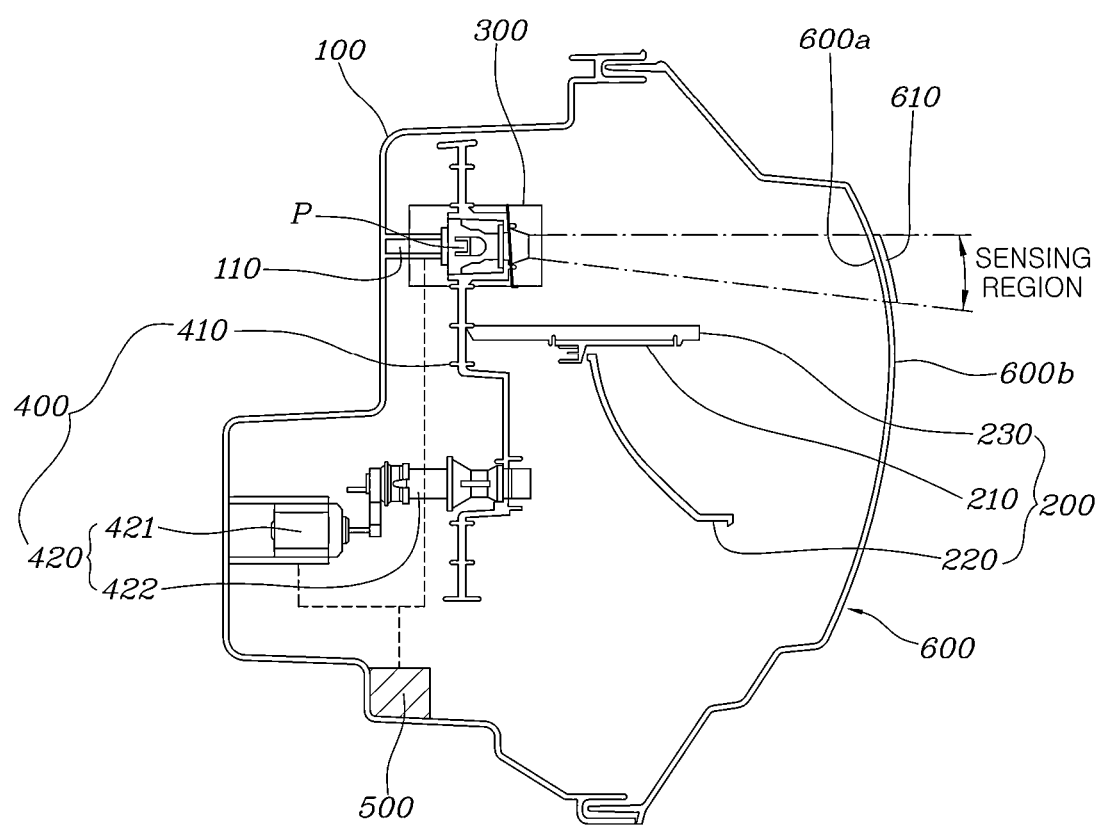
FIG. 1 is a view illustrating a leveling apparatus for a headlamp for a vehicle according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

When a component, device, element, or the like of the present disclosure is described as having a purpose or performing an operation, function, or the like, the component, device, or element should be considered herein as being "configured to" meet that purpose or to perform that operation or function.

Hereinafter, a leveling apparatus for a headlamp for a vehicle according to an exemplary embodiment of the present disclosure is described with reference to the accompanying drawings.

Figure 2:
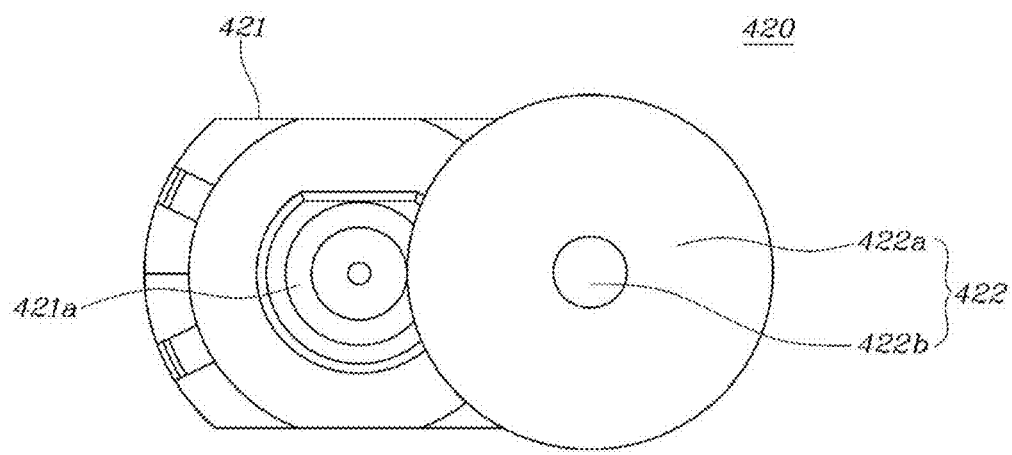
FIG. 2 is a view illustrating an embodiment of a tilting means according to the present disclosure.
Figure 3:
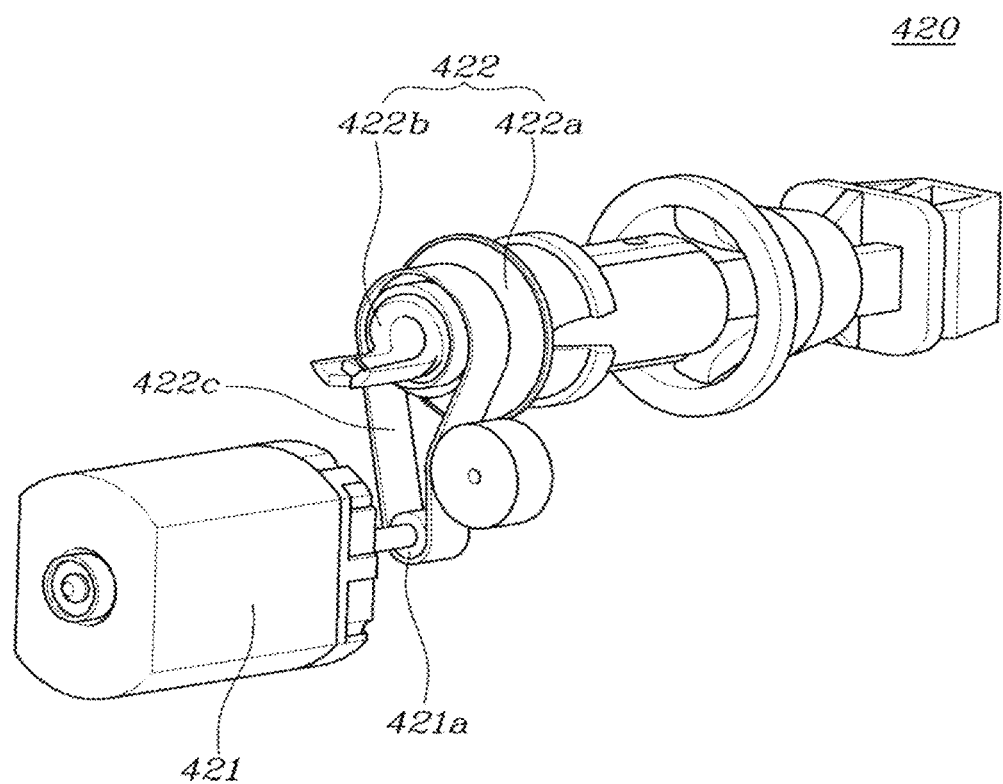
FIG. 3 is a view illustrating another embodiment of the tilting means according to the present disclosure.
Figure 4:
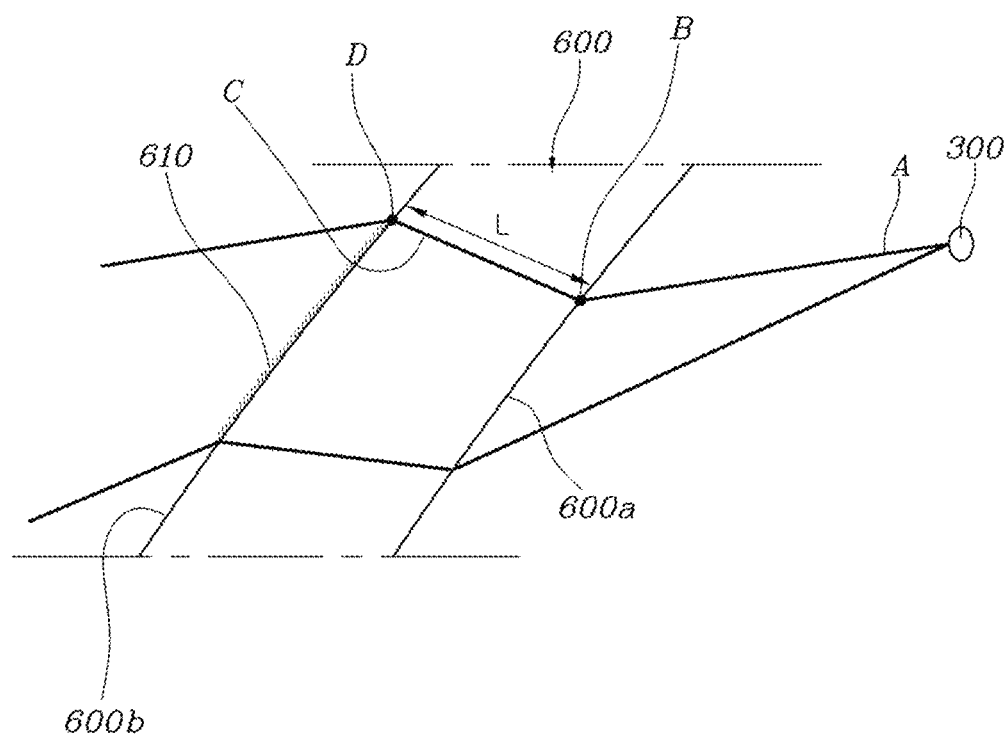
FIG. 4 is a view for explaining an outer lens according to an embodiment of the present disclosure.

FIG. 1 is a view illustrating a leveling apparatus for a headlamp for a vehicle according to an embodiment of the present disclosure, FIG. 2 is a view illustrating an embodiment of a tilting means according to the present disclosure, FIG. 3 is a view illustrating another embodiment of the tilting means according to the present disclosure, and FIG. 4 is a view for explaining an outer lens according to an embodiment of the present disclosure.

As illustrated in FIG. 1, the leveling apparatus for a headlamp for a vehicle includes: a housing 100 disposed at a front side of a vehicle; a light source module 200 disposed in the housing 100 and configured to emit light; a tilting sensor 300 disposed in the housing 100 and configured to detect an inclination degree of a road depending on a state of a road in front of the vehicle; a tilting means 400 installed in the housing 100; and a controller 500 configured to receive a signal detected by the tilting sensor 300 and adjust a light emission angle of the light source module 200 by controlling the tilting means 400 depending on the inclination degree of the road. The tilting means 400 is tiltably installed in the housing 100 and thus tiltable in an upward/downward direction of the housing 100. And the light source module 200 and the tilting sensor 300 are installed on the tilting means 400 so that the light source module 200 and the tilting sensor 300 are tilted together.

The housing 100 is disposed at the front side of the vehicle and constitutes the headlamp.

In the housing 100, the light source module 200, the tilting sensor 300, the tilting means 400, and the controller 500 are provided, and thus the respective components are integrated and modularized, thereby constituting the headlamp.

The light source module 200 may include a light source 210 configured to emit light, and a reflector 220 configured to reflect the light emitted from the light source 210 and propagate the light forward. In this case, the light source module 200 may further include a heat sink 230 for dissipating heat generated when the light source 210 emits light.

The tilting sensor 300 may be a laser sensor and recognize the road state by emitting a sensing light beam forward. That is, the tilting sensor 300 may be used to recognize whether the road in front of the vehicle is an upward or downward slope.

The light source module 200 and the tilting sensor 300 are mounted on the tilting means 400 installed in the housing 100 so as to be tiltable in the upward/downward direction. That is, the light source module 200 and the tilting sensor 300 are installed in the housing 100 by means of the tilting means 400. The light source module 200 and the tilting sensor 300 rotate together depending on whether the tilting means 400 performs a tilting operation, such that a light emission direction and a sensing region are changed together.

Therefore, according to the present disclosure, when the tilting means 400 is adjusted depending on the inclination degree of the road detected by the tilting sensor 300, the light emission direction in which the light is emitted from the light source module 200 is also adjusted. This process may be performed as the controller 500 controls the tilting means 400 depending on the signal detected by the tilting sensor 300.

In one embodiment of the present disclosure, the tilting means 400 includes: a base plate 410 rotatably installed on a pivot part 110 extending forward from the housing 100 and having a light source module 200 and a tilting sensor 300 installed thereon; and a rotational mechanism 420 installed in the housing 100, connected to the base plate 410, and configured to tilt the base plate 410 depending on whether the operation is performed.

As described above, the tilting means 400 includes the base plate 410 and the rotational mechanism 420. The base plate 410 extends downward so that the light source module 200, the tilting sensor 300, and the rotational mechanism 420 may be installed thereon.

The base plate 410 is hingedly connected to the pivot part 110 extending forward from the housing 100 and may rotate in the upward/downward direction. A light emission position of the light source module 200 and a sensing direction of the tilting sensor 300 are adjusted as the base plate 410 is rotated by the rotational mechanism 420.

In this case, the tilting sensor 300 is installed on a rotation center axis P of the base plate 410 and rotates coaxially with the base plate 410.

As described above, the tilting sensor 300 is installed on the rotation center axis P of the base plate 410 so as to have the same rotation center axis P, such that the base plate 410 and the tilting sensor 300 rotate with the same rotation radius. When a distortion compensation part 610 is applied to an outer lens 600, the distortion compensation part 610 may receive a change in a sensing region of the tilting sensor 300 that occurs when the base plate 410 is tilted.

In addition, according to the present disclosure, the tilting means 400 operates depending on a gradient of a road measured by the tilting sensor 300. Therefore, the tilting sensor 300 and the tilting means 400 rotate about the same axis, and the tilting means 400 is controlled only depending on information on a state of the road detected by the tilting sensor 300, such that the light emission position of the light source module 200 may be adjusted.

Meanwhile, the light source module 200 is spaced apart from the base plate 410 toward an upper or lower side of the tilting sensor 300 and installed adjacent to the tilting sensor 300 so as not to overlap a sensing range of the tilting sensor 300.

Because the light source module 200 is installed adjacent to the tilting sensor 300 as described above, the light emission position of the light source module 200 may be adjusted when the sensing region of the tilting sensor 300 is changed as the tilting means 400 tilts.

In particular, because the light source module 200 is installed so as not to overlap the sensing region of the tilting sensor 300, the state of the road is accurately detected by the tilting sensor 300. In addition, because the light source module 200 and the tilting sensor 300 rotate together, the light source module 200 does not interfere with the sensing region of the tilting sensor 300 even though the tilting means 400 tilts.

Meanwhile, as illustrated in FIGS. 1 to 3, the rotational mechanism 420 may include: a drive part 421 installed in the housing 100 and configured to generate power; and a movement part 422 installed on the base plate 410. The movement part 422 is connected to the drive part 421 and moves in a forward/rearward direction by receiving power from the drive part 421 to tilt the base plate 410.

That is, the rotational mechanism 420 includes the drive part 421 and the movement part 422, the drive part 421 generates power, and the movement part 422 receives the power from the drive part 421 and tilts the base plate 410.

The drive part 421 is installed in the housing 100 and generates power. The movement part 422 is connected to the drive part 421 and the base plate 410 and receive the power from the drive part 421 to tilt the base plate 410.

As illustrated in FIG. 2, in one embodiment of the rotational mechanism 420, the drive part 421 is configured as a rotary motor and has a circular power transmission part 421a. The movement part 422 is disposed to be in friction contact with the power transmission part 421a and changes in length by receiving a rotational force when the power transmission part 421a rotates, such that the base plate 410 may move.

In one form, the drive part 421 is configured as a rotary motor and rotates the power transmission part 421a, and a periphery of the power transmission part 421a has a circular shape.

The movement part 422 may include a corresponding portion 422a being in friction contact with the power transmission part 421a, and a rod portion 422b configured to rectilinearly move when the corresponding portion 422a rotates. In one embodiment, the corresponding portion 422a of the movement part 422 has a circular shape and is in friction contact with the power transmission part 421a. The corresponding portion 422a may push and tilt the base plate 410 as the rod portion 422b, which is thread-connected to the corresponding portion 422a, rectilinearly moves when the corresponding portion 422a rotates.

Because the power transmission part 421a of the drive part 421 of the rotational mechanism 420 and the corresponding portion 422a of the movement part 422 transmit power in a frictional manner, the mechanical noise is reduced or minimized, and the discomfort caused by the noise is minimized when the base plate 410 tilts.

In another embodiment, as illustrated in FIG. 3, the drive part 421 is configured as a rotary motor and has the power transmission part 421a having a circular shape, the movement part 422 is connected to the power transmission part 421a by means of a belt 422c, and the base plate 410 moves with the change in length when the power transmission part 421a rotates.

That is, the drive part 421 is configured as a rotary motor and rotates the power transmission part 421a, and a periphery of the power transmission part 421a has a circular shape.

The movement part 422 may include the corresponding portion 422a connected to the power transmission part 421a by means of the belt 422c, and the rod portion 422b rectilinearly moves when the corresponding portion 422a rotates. In one embodiment, the corresponding portion 422a of the movement part 422 has a circular shape and is connected to the power transmission part 421a by means of the belt 422c. The corresponding portion 422a may push and tilt the base plate 410 as the rod portion 422b, which is thread-connected to the corresponding portion 422a, rectilinearly moves when the corresponding portion 422a rotates.

Because the power transmission part 421a of the drive part 421 of the rotational mechanism 420 is connected to the corresponding portion 422a of the movement part 422 by means of the belt 422c as described above, the mechanical noise is reduced or minimized, and the discomfort caused by the noise is minimized when the base plate 410 tilts.

As illustrated in FIGS. 1 and 4, the leveling apparatus may further include the outer lens 600 mounted on a front surface of the housing 100, configured to transmit the light emitted from the light source module 200 and the tilting sensor 300, and having the distortion compensation part 610 formed in a partial section.

The outer lens 600 may be transparent to transmit light emitted from the light source module 200 and sensing light emitted from the tilting sensor 300. In particular, the distortion compensation part 610 is formed in a partial section of the outer lens 600.

In this case, the distortion compensation part 610 may be formed by implementing a difference in thickness and shape of the outer lens 600 or adding a separate lens to the outer lens 600. In addition, the distortion compensation part 610 is formed at a position at which the sensing light emitted from the tilting sensor 300 enters. Therefore, even though the tilting means 400 tilts, an angle at which the sensing light emitted from the tilting sensor 300 enters the outer lens 600 is equal to an angle at which the sensing light passes through the outer lens 600.

In detail, the distortion compensation part 610 may derives, on the basis of the Snell's law, an angle at which the sensing light emitted from the tilting sensor 300 is refracted when entering an incident surface 600a of the outer lens 600 and be formed on an emergent surface 600b of the outer lens 600 depending on a distance by which the sensing light moves to the emergent surface 600b after being refracted by the incident surface 600a and a point at which the sensing light enters the emergent surface 600b.

That is, as illustrated in FIG. 4, incident light A is set as the sensing light emitted from the tilting sensor 300 enters the incident surface 600a of the outer lens 600. In this case, an angle of the refracted light C is calculated, on the basis of the Snell's law, from an incident point B at which the incident light A enters the incident surface 600a of the outer lens 600. Therefore, an emergent point D at which the light C refracted on the incident point B enters the emergent surface 600b of the outer lens 600 may be derived, and a distance L of the refracted light C may also be derived.

In addition, the distortion compensation part 610 is formed within a predetermined range in the upward/downward direction on the emergent surface 600b of the outer lens 600 based on the distance by which the sensing light moves to the emergent surface 600b after being refracted on the incident surface 600a and the point at which the sensing light enters the emergent surface 600b.

That is, the range of the outer lens 600 in the upward/downward direction is expanded on the basis of the distance by which the sensing light emitted from the tilting sensor 300 moves to the emergent surface 600b after being refracted on the incident surface 600a and the emergent point at which the sensing light enters the emergent surface 600b, such that the distortion compensation part 610 covers the sensing region even though the sensing region of the tilting sensor 300 is moved by the tilting means 400.

Therefore, according to the present disclosure, the sensing light emitted from the tilting sensor 300 is compensated by the distortion compensation part 610 even though the sensing light passes through the outer lens 600. Therefore, even though the propagation direction of the sensing light is changed by the tilting means 400, an emergent angle of the sensing light emitted from the tilting sensor 300 is equal to an emergent angle of the sensing light passing through the outer lens 600.

Therefore, the accuracy in recognizing the road state using the tilting sensor 300 is improved.

Meanwhile, when the change in angle detected by the tilting sensor 300 is equal to or larger than a reference angle, the controller 500 recognizes whether the amount of change in angle increases or decreases. When the recognition result indicates that the amount of change in angle increases, the controller 500 allows the tilting means 400 to tilt upward.

When the recognition result indicates that the amount of change in angle decreases, the controller 500 allows the tilting means 400 to tilt downward.

That is, when the change in angle detected by the tilting sensor 300 is equal to or larger than the reference angle, the controller 500 may recognize that the vehicle enters the upward slope or the downward slope. The controller 500 may determine that the vehicle travels on an upward slope when the amount of change in angle increases, and determine that the vehicle travels on the downward slope when the amount of change in angle decreases.

Therefore, when the controller 500 determines that the vehicle travels on the upward slope as the amount of change in angle increases, the tilting means 400 tilts upward, and the light emission direction of the light source module 200 is adjusted upward, thereby ensuring the front visual field even on the upward slope.

In addition, when the controller 500 determines that the vehicle travels on the downward slope as the amount of change in angle decreases, the tilting means 400 tilts downward, and the light emission direction of the light source module 200 is adjusted downward, thereby ensuring the front visual field even on the downward slope.

Meanwhile, the controller 500 controls the tilting means 400 so that the change in angle detected by the tilting sensor 300 reaches an initial angle warn the tilting operation of the tilting means 400 is controlled. In this case, the initial angle may be an angle at which the light source module 200 and the tilting sensor 300 are determined depending on initial design.

That is, when the change in angle detected by the tilting sensor 300 is equal to or larger than the reference angle, the controller 500 controls and tilts the tilting means 400 so that the change in angle detected by the tilting sensor 300 reaches the initial angle, such that the light emission position of the light source module 200 is adjusted by the tilting means 400, which makes it possible to ensure the front visual field.

For example, when the change in angle detected by the tilting sensor 300 increases and departs from the reference angle, the controller 500 controls and tilts the tilting means 400 upward so that the change in angle of the tilting sensor 300 reaches the initial angle, such that the light emission position of the light source module 200 is adjusted upward by the tilting means 400, which makes it possible to ensure the front visual field on the upward slope.

According to the leveling apparatus for a headlamp for a vehicle structured as described above, the tilting sensor for scanning the road surface and the light source module for emitting the light are integrated, such that the control for adjusting the light emission position is simplified, and the accuracy and reliability in respect to the change in light emission positions are improved.

While the specific embodiments of the present disclosure have been illustrated and described, it should be obvious to those having ordinary skill in the art that the present disclosure may be variously modified and changed without departing from the technical spirit of the present disclosure.

What is claimed is:

1. A leveling apparatus for a headlamp for a vehicle, the leveling apparatus comprising:
   a housing disposed at a front side of a vehicle;
   a light source module disposed in the housing and configured to emit light;
   a tilting sensor disposed in the housing and configured to detect an inclination degree of a road;
   a tilting means configured to tilt the light source module and the tilting sensor together; and a controller configured to:
receive a signal detected by the tilting sensor and control the tilting means based on the inclination degree of the road to adjust a light emission angle of the light source module,
wherein when a change in angle detected by the tilting sensor is equal to or larger than a reference angle, the controller is configured to recognize whether an amount of the change in angle increases or decreases and allow the tilting means to tilt based on the amount of change in angle.

2. The leveling apparatus of claim 1, wherein the tilting means comprises: a base plate rotatably installed on a pivot part extending forward from the housing; and a rotational mechanism installed in the housing and connected to the base plate, wherein the light source module and the tilting sensor are installed on the base plate and the rotational mechanism is configured to tilt the base plate.

3. The leveling apparatus of claim 2, wherein the tilting sensor is installed on a rotation center axis of the base plate and rotates coaxially with the base plate.

4. The leveling apparatus of claim 2, wherein the light source module is installed on the base plate and disposed adjacent to the tilting sensor so as not to overlap a sensing range of the tilting sensor.

5. The leveling apparatus of claim 2, wherein the rotational mechanism comprises: a drive part installed in the housing and configured to generate power; and a movement part installed on the base plate, connected to the drive part, and configured to move in a forward/rearward direction by receiving power from the drive part to tilt the base plate.

6. The leveling apparatus of claim 5, wherein the drive part is configured as a rotary motor and has a power transmission part having a circular shape, and
wherein the movement part is disposed to be in friction contact with the power transmission part and moves the base plate by changing in length by receiving a rotational force when the power transmission part rotates.

7. The leveling apparatus of claim 5, wherein the drive part is configured as a rotary motor and has a power transmission part having a circular shape, and
wherein the movement part is connected to the power transmission part by a belt and moves the base plate by changing in length when the power transmission part rotates.

8. The leveling apparatus of claim 1, further comprising: an outer lens mounted on a front surface of the housing, configured to transmit a light emitted from the light source module and a sensing light emitted from the tilting sensor, and including a distortion compensation part formed in a partial section thereof.

9. The leveling apparatus of claim 8, wherein the distortion compensation part is formed such that an angle at which the sensing light emitted from the tilting sensor enters an incident surface of the outer lens is equal to an angle at which the sensing light exits an emergent surface of the outer lens.

10. The leveling apparatus of claim 9, wherein the distortion compensation part is formed within a predetermined range in an upward/downward direction on the emergent surface of the outer lens based on a distance by which the sensing light moves to the emergent surface after being refracted on the incident surface and a point at which the sensing light enters the emergent surface.

11. The leveling apparatus of claim 1, wherein the controller is configured to control a tilting operation of the tilting means so that the change in angle detected by the tilting sensor reaches an initial angle.

12. A leveling apparatus for a headlamp for a vehicle, the leveling apparatus comprising:
a housing disposed at a front side of a vehicle;
a light source module disposed in the housing and configured to emit light;
a tilting sensor disposed in the housing and configured to detect an inclination degree of a road;
a tilting means configured to tilt the light source module and the tilting sensor together; and
a controller configured to:
receive a signal detected by the tilting sensor and control the tilting means based on the inclination degree of the road to adjust a light emission angle of the light source module,
wherein the tilting means comprises: a base plate rotatably installed on a pivot part extending forward from the housing; and a rotational mechanism installed in the housing and connected to the base plate, wherein the light source module and the tilting sensor are installed on the base plate and the rotational mechanism is configured to tilt the base plate, and
wherein the tilting sensor is installed on a rotation center axis of the base plate and rotates coaxially with the base plate.

13. A leveling apparatus for a headlamp for a vehicle, the leveling apparatus comprising:
a housing disposed at a front side of a vehicle;
a light source module disposed in the housing and configured to emit light;
a tilting sensor disposed in the housing and configured to detect an inclination degree of a road;
a tilting means configured to tilt the light source module and the tilting sensor together; and
a controller configured to:
receive a signal detected by the tilting sensor and control the tilting means based on the inclination degree of the road to adjust a light emission angle of the light source module,
wherein the tilting means comprises: a base plate rotatably installed on a pivot part extending forward from the housing; and a rotational mechanism installed in the housing and connected to the base plate, wherein the light source module and the tilting sensor are installed on the base plate and the rotational mechanism is configured to tilt the base plate, and
wherein the rotational mechanism comprises: a drive part installed in the housing and configured to generate power; and a movement part installed on the base plate, connected to the drive part, and configured to move in a forward/rearward direction by receiving power from the drive part to tilt the base plate.

14. The leveling apparatus of claim 13, wherein the drive part is configured as a rotary motor and has a power transmission part having a circular shape, and
wherein the movement part is disposed to be in friction contact with the power transmission part and moves the base plate by changing in length by receiving a rotational force when the power transmission part rotates.

15. The leveling apparatus of claim 13, wherein the drive part is configured as a rotary motor and has a power transmission part having a circular shape, and
wherein the movement part is connected to the power transmission part by a belt and moves the base plate by changing in length when the power transmission part rotates.

* * * * *